Aug. 2, 1966　　　R. C. ANGELL ETAL　　　3,264,382
METHOD FOR MAKING FOAM BACKRESTS
FOR VEHICLE RECLINING CHAIRS
Filed Sept. 18, 1963　　　　　　　　　　　4 Sheets-Sheet 1

INVENTORS
Robert C. Angell
Stephen B. Kolk

WITNESS
Harry S. Brown Jr.

BY John S. Braddock
ATTORNEY

INVENTORS
Robert C. Angell
Stephen B. Kolk

BY John S. Braddock
ATTORNEY

WITNESS
Harry S. Brown Jr.

INVENTORS
*Robert C. Angell*
*Stephen B. Kolk*
BY *John S. Braddock*
ATTORNEY

WITNESS
*Harry S. Brown Jr.*

United States Patent Office 3,264,382
Patented August 2, 1966

3,264,382
METHOD FOR MAKING FOAM BACKRESTS FOR VEHICLE RECLINING CHAIRS
Robert C. Angell and Stephen B. Kolk, Grand Rapids, Mich., assignors to American Seating Company, Grand Rapids, Mich., a corporation of New Jersey
Filed Sept. 18, 1963, Ser. No. 309,813
4 Claims. (Cl. 264—46)

The present invention relates to a method for making foam cushions and more particularly to foam backrests for vehicle reclining chairs.

The primary objects of the invention are to provide a method of foaming cushions having regions of different density and resilience, e.g. the backrest cushion of a recliner wherein the main body of the cushion is comprised of a relatively firm foam material and wherein the headrest is comprised of foam material of greater resilience; to provide a novel method of foaming cushions in which each cushion has a portion of its outer surface contoured outwardly; and to provide a method of foaming a cushion having an internal frame comprising rigid parts mechanically connected for articulated movement relative to each other, e.g. a recliner backrest having an upper headrest portion swingable between positions of fore-and-aft adjustment; and to provide a method for making a backrest construction for a vehicle recliner or the like which is durable and comfortable in use, reasonably economical in manufacture and attractive in appearance.

The invention is illustrated by the accompanying drawings, wherein.

Figure 1:
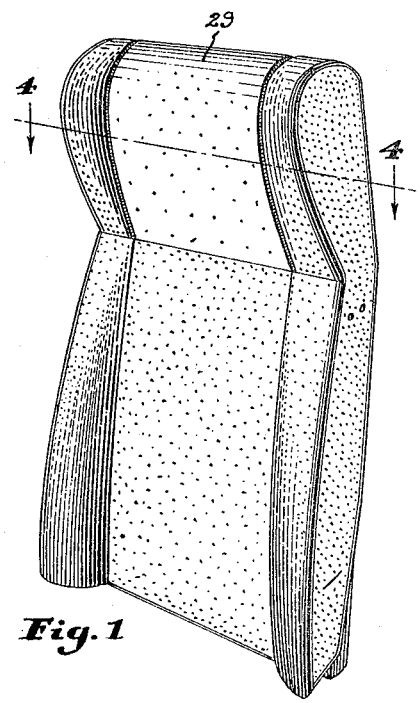
FIGURE 1 is a front perspective view of a foam backrest for a chair of the recliner type commonly installed in busses, airplanes and other vehicles, the backrest being here shown without its upholstery cover material.
Figure 2:
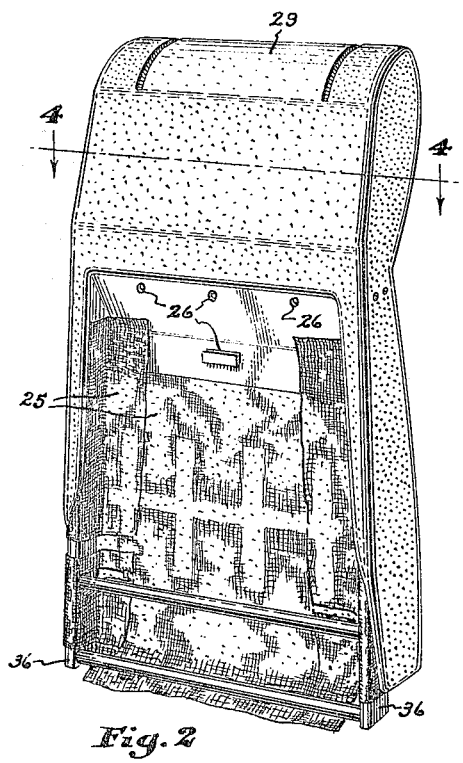
FIGURE 2 is a rear perspective view of the same.
Figure 3:
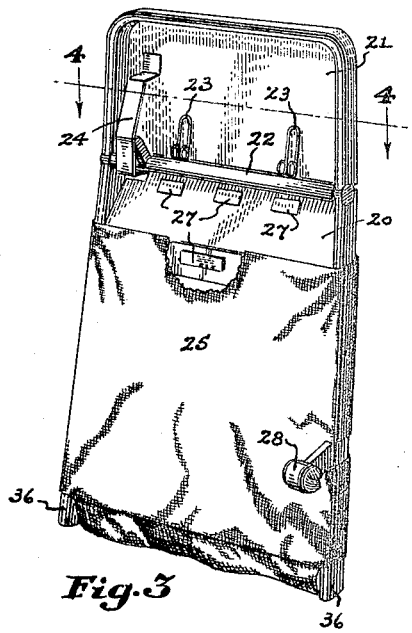
FIGURE 3 is a front perspective view of the internal frame of the backrest.
Figure 5:
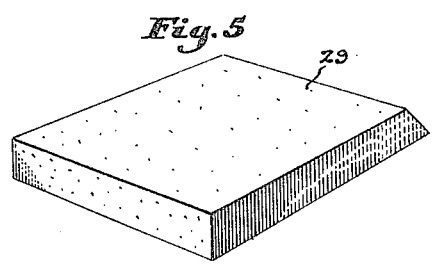
Figure 4:
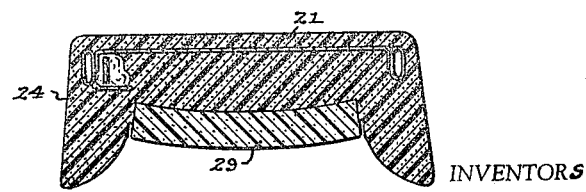
Figure 6:
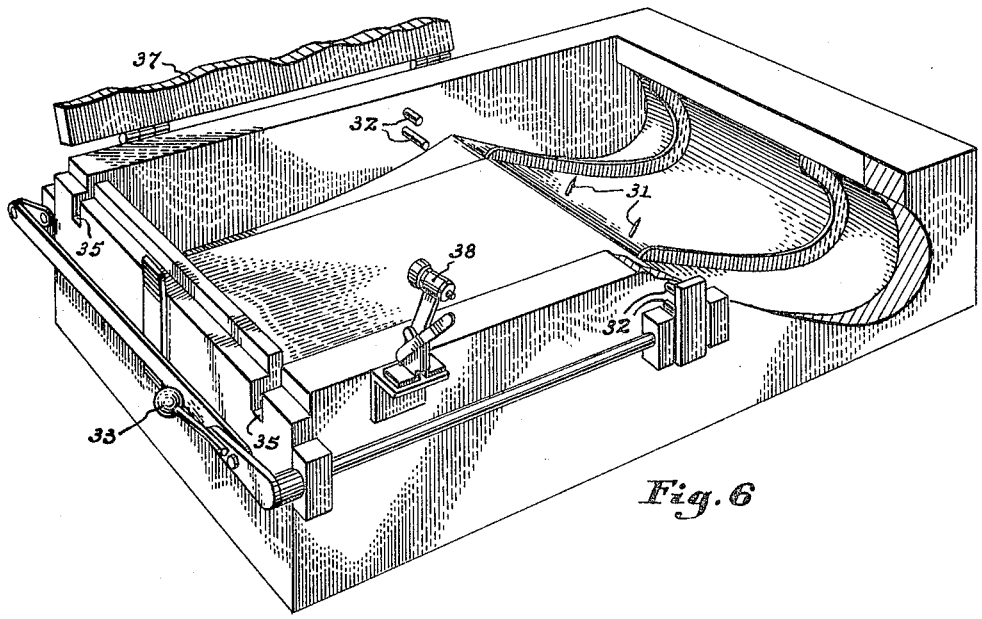
Figure 7:
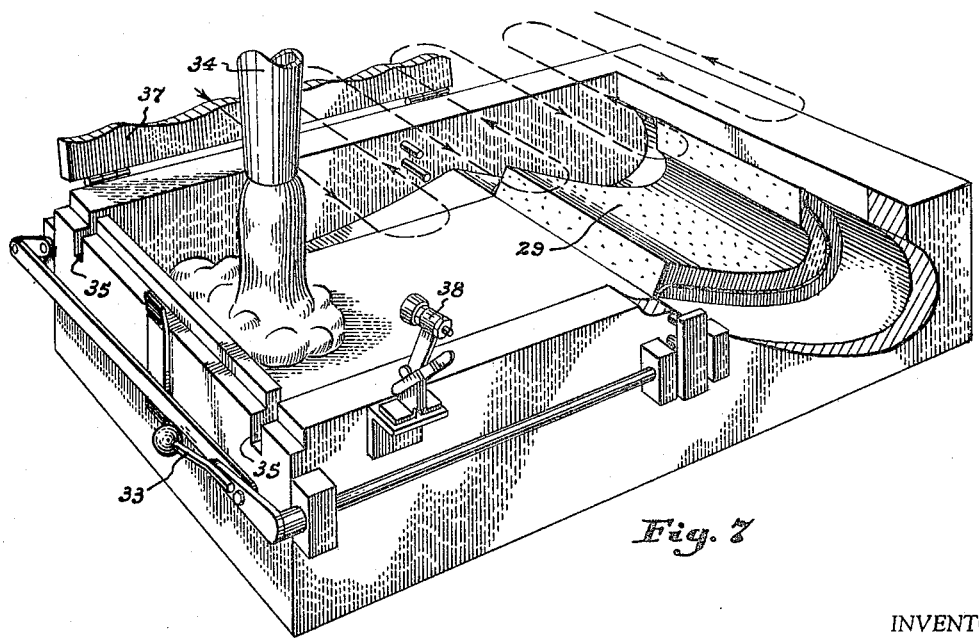
Figure 8:
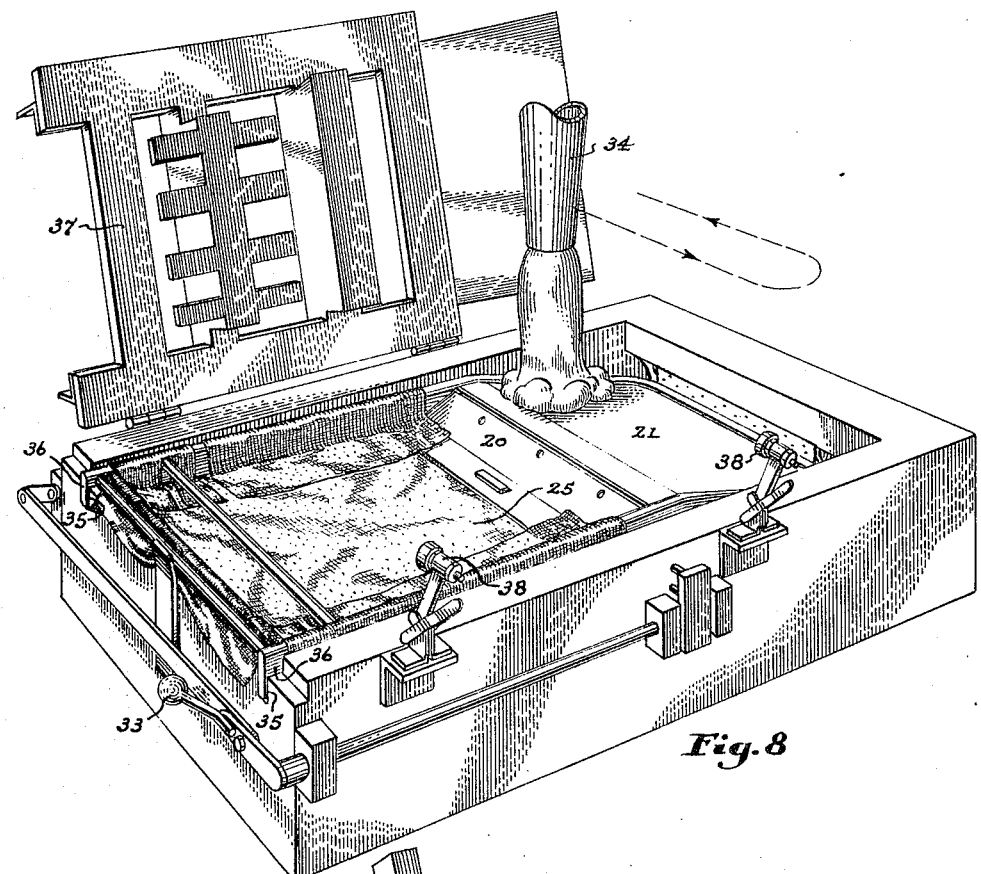
Figure 9:
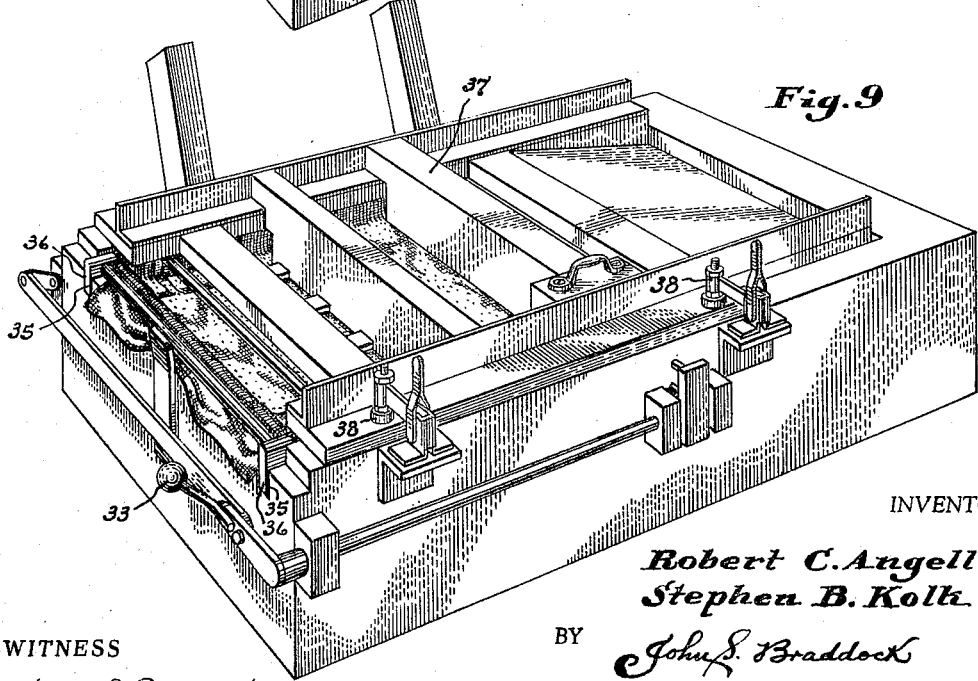
Figure 10:
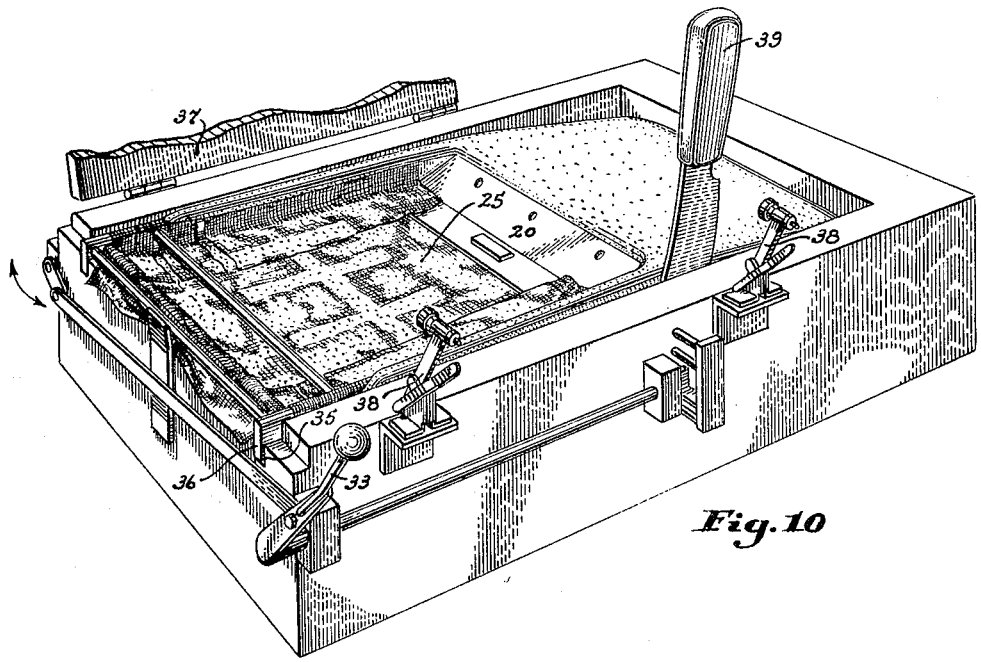
Figure 11:
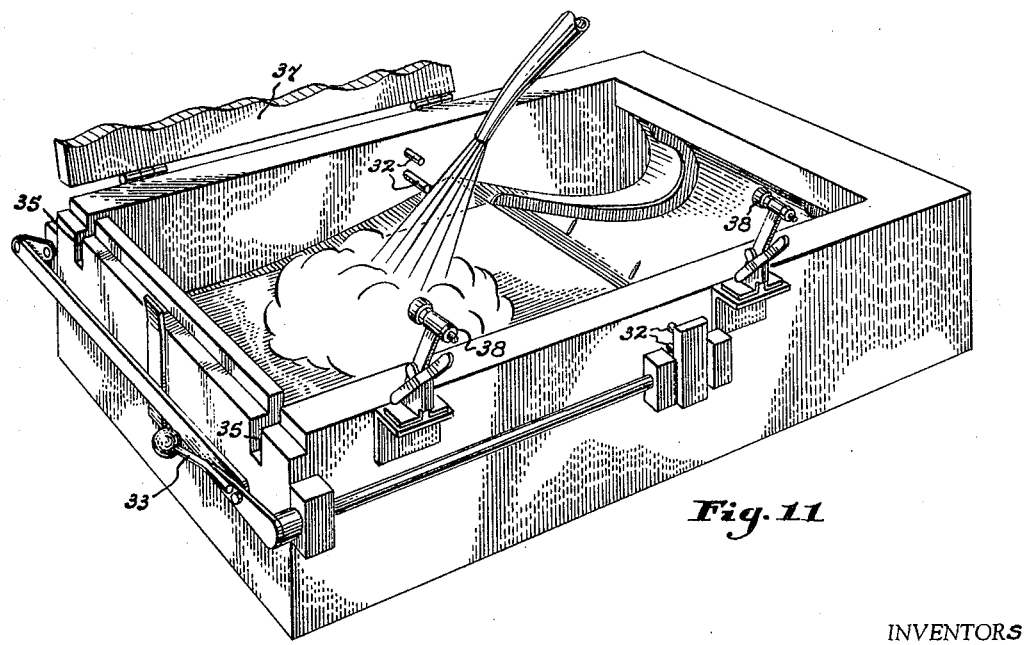

FIGURE 4 is a horizontal sectional view of the backrest taken on lines 4—4 of FIGURES 1 and 2, the plane of section through the internal frame of the backrest being indicated also by the line 4—4 of FIGURE 3;

FIGURE 5 is a perspective view of a pre-foamed insert which forms part of the completed backrest;

FIGURE 6 is a fragmentary perspective view of a mold in which the foamed backrest is formed, the mold being here shown open and empty;

FIGURE 7 is a perspective view illustrating the initial steps in performing the method by which the backrest is made;

FIGURE 8 is a perspective view illustrating further steps in performing the method of the invention;

FIGURE 9 is a perspective view of the mold with the cover thereof in closed position;

FIGURE 10 is a perspective view illustrating the method step of removing the completed foam backrest from the mold; and FIGURE 11 is a perspective view illustrating spraying of the interior of the mold prior to foaming a succeeding backrest therein.

Referring now in detail to these drawings, the completed foam backrest shown in FIGURES 1 and 2 has an internal foundation frame of metal or other rigid material, as seen in FIGURE 3. The frame comprises a lower back part 20 in the form of an open rectangular framework, and an upper head part 21 which is pivotally connected at 22 to the upper end of the lower back part 20. The head part 21 is thus mounted on the back part 20 for articulated swinging movement between several positions of fore-and-aft adjustment relative to the back part 20. The mechanical connections between the head part 21 and the back part 20 include, in addition to the pivot means indicated at 22, springs 23 for normally urging the head part 21 in a rearwardly direction, and a latch mechanism indicated at 24 for securing the head part in a selected forwardly moved position and for releasing the head part when in its extreme forward position so that it is returned by springs 23 to its extreme rearward position. Complete details of this latch mechanism indicated at 24 are disclosed in U.S. Patent No. 2,828,810, issued April 1, 1958 to Chester J. Barecki and Oscar J. Nelson and by them assigned to our assignee.

Pre-foaming operations

Prior to foaming of the complete foamed backrest, certain pre-foaming operations are performed. Burlap 25 is adhesively applied to the lower back part 20 of the frame to effectively seal the opening in this part 20 against the passage of any appreciable amount of foaming material therethrough. Certain attachment openings designated 26 in FIGURE 2, the purpose of which is unimportant to an understanding of the present invention, are taped shut as seen at 27 in FIGURE 3 to prevent the passage of foaming material therethrough. Also, the borehole in an attachment bushing 28 is taped shut to prevent the entry of foaming material. Next, the mechanical connections 22, 23 and 24 between the upper head part 21 and the lower back part 20 of the frame, are heavily encased in grease.

A pre-foamed headrest insert 29 is provided, this being a polyether urethane type foam of low density and consequently relatively great resilience. This headrest insert 29 is placed in the headrest region of the mold 30 as seen in FIGURE 7 and is held in position by spikes 31 in the mold 30 (see FIGURE 6).

Frame locating pins 32 are projected into the mold 30 by means of suitable mechanism mounted on the outside of the mold and including an operating lever 33 which is thrown forwardly to its position seen in FIGURES 6–9 and 11 to project the pins 32 into the mold.

Pouring procedure

The first part of the pouring procedure is illustrated in FIGURE 7. A measured amount of polyether urethane type foaming material in a fluid state is introduced into the mold through a nozzle 34 which is passed back and forth between one end and the other end of the mold as indicated by the dotted lines and arrows of FIGURE 7. This insures an even distribution of the foaming material in the mold 30.

Next the metal frame is placed in position in the mold as seen in FIGURE 8. This frame serves as a barrier to the foaming of the material which had previously been injected into the mold. Minute amounts of the foaming material penetrate the interstices of the burlap 25 thus insuring a firm bond between the frame and the foam. The locator pins 32, and slots 35 in the mold into which fit the lower end portions 36 of the lower frame part 20, space the frame slightly inwardly from the sides of the mold so as to provide foam material at the sides of the backrest.

As also seen in FIGURE 8, a measured amount of the foaming material is next introduced into the mold behind the upper head part 21 of the frame as indicated by the dotted lines and arrows in this view. The mold cover 37 is then closed and clamped tightly shut by means of clamps 38 so that all of the foaming material is confined within the mold. The cover 37 is so constructed that the region behind the lower back part 20 of the frame is completely sealed off and none of the foaming material can enter this region. After the mold is clamped shut and the foaming is complete, the mold is passed through a baking oven so that the foamed material in the mold is completely cured.

After baking, the mold is opened. Lever 33 is pulled rearwardly to withdraw the locating pins 32 from the mold, as seen in FIGURE 10. The completed foam backrest with its internal frame is then stripped from the mold using a large knife 39 as necessary. It is desirable that the completed backrest be crushed, while still warm, in a suitable press to break down the individual gas bubbles or cells in a uniform manner so as to prevent shrinkage of these cells, and consequent shrinkage of the entire cushion, upon cooling.

Prior to re-use of the mold to make another cushion, the interior of the mold is sprayed with a release agent such as a low-temperature melting wax, as seen in FIGURE 11. This release agent facilitates removal of succeeding cushions from the mold.

The foaming material which is used in the foaming process hereinabove described is of a type which produces a relatively high density and relatively firm resilient foam, by contrast with the low density, more resilient headrest insert, and the result is a backrest of unusual comfort. During the foaming operation described, the headrest insert is slightly compressed, so that when the completed cushion is removed from the mold the outer surface of the insert assumes an outwardly crowned or contoured surface, as seen in FIGURE 4, which is desirable.

It will be seen that the upper head part 21 of the frame and its mechanical connections to the lower back part 20 of the frame are completely enclosed by foam, with several resultant advantages. The grease which heavily encases the mechanical connections cannot escape and these articulated parts are thus permanently lubricated. It has been found that the presence of the grease in no way interferes with the foaming operation. It is to be noted also that the foam on the back side of the headrest provides a protective padding for an occupant of the next chair to the rear in the event he is suddenly thrown forwardly as in a crash.

It will thus be seen that the invention provides an improved cushion and method of making the same and while but one construction and one method have been herein shown and described it will be understood that numerous constructional details and method steps may be altered or omitted without departing from the spirit of the invention as defined by the following claims.

We claim:

1. In a method for forming a chair foam backrest having an outwardly-contoured headrest of greater resilience than the body of the backrest, the steps of preforming a rectangular resilient thick foam headrest cushion of low-density type foamable plastic material with the butt ends of the cushion facing in opposite directions, flexing said cushion to bend it into a curved body with said butt ends facing substantially in the same direction, securing said body while in said flexed and curved position within a mold conforming generally to the shape of the finished backrest, introducing a high-density type foamable plastic material into the mold to fill the mold and to unite with the butt ends of said headrest cushion, and removing said united backrest and headrest from said mold.

2. The method of claim 1 in which the preformed headrest cushion is provided with a bevel at one end thereof.

3. The method of claim 1 in which spacers are placed along side portions of said headrest cushion before introducing said high-density type foamable plastic material into the mold whereby upon removal of said backrest from said mold side portions of said headrest cushion are spaced from said backrest body.

4. In a method for forming a chair foam backrest having an outwardly-contoured headrest of greater resilience than the body of the backrest, the steps of flexing a thick rectangular foam headrest cushion of low-density type foamable plastic material to bend the cushion into a curved shape with the ends of the cushion facing substantially in the same direction, securing said body while in said flexed and curved position within a mold conforming generally to the shape of the finished backrest, introducing a high-density type foamable plastic material into the mold to fill the mold and to unite with the ends of said headrest cushion, and removing said united backrest and headrest from said mold.

References Cited by the Examiner

UNITED STATES PATENTS

| | | | |
|---|---|---|---|
| 2,138,314 | 11/1938 | Van Derveer | 297—460 |
| 2,801,678 | 8/1957 | Brandon | 297—396 |
| 2,828,810 | 4/1958 | Barecki et al. | 297—396 |
| 2,838,100 | 6/1958 | Follows | 264—45 XR |
| 2,839,125 | 6/1958 | Brandon | 297—396 |
| 2,845,997 | 8/1958 | Waite | 264—46 XR |
| 2,908,943 | 10/1959 | Miller | 264—46 |
| 2,927,876 | 3/1960 | Hoppe et al. | 264—46 XR |
| 3,042,137 | 7/1962 | Mathues et al. | 264—46 XR |
| 3,082,486 | 3/1963 | Khawam et al. | 264—45 |
| 3,086,819 | 4/1963 | Effeny | 297—460 |
| 3,112,987 | 12/1963 | Griffiths et al. | 264—45 |
| 3,161,436 | 12/1964 | Hood | 264—56 XR |

FOREIGN PATENTS 859,314  1/1961  Great Britain.

ALEXANDER H. BRODMERKEL, *Primary Examiner.*

FRANK B. SHERRY, *Examiner.*

C. A. NUNBERG, P. E. ANDERSON,
*Assistant Examiners.*